United States Patent
Yamamoto

(10) Patent No.: US 9,206,879 B2
(45) Date of Patent: Dec. 8, 2015

(54) BALANCER

(76) Inventor: Hiroaki Yamamoto, Osaka (JP)

( * ) Notice: Subject to any disclaimer, the term of this patent is extended or adjusted under 35 U.S.C. 154(b) by 0 days.

(21) Appl. No.: 13/578,655

(22) PCT Filed: Oct. 4, 2010

(86) PCT No.: PCT/JP2010/005943
§ 371 (c)(1),
(2), (4) Date: Aug. 13, 2012

(87) PCT Pub. No.: WO2011/101932
PCT Pub. Date: Aug. 25, 2011

(65) Prior Publication Data
US 2012/0304809 A1    Dec. 6, 2012

(30) Foreign Application Priority Data

Feb. 19, 2010 (JP) ................. 2010-035468

(51) Int. Cl.
*F16F 15/14* (2006.01)
*F16F 15/16* (2006.01)
(Continued)

(52) U.S. Cl.
CPC ............. *F16F 15/36* (2013.01); *Y10T 74/2128* (2015.01)

(58) Field of Classification Search
CPC ...... F16F 15/36; F16F 15/1442; B23Q 3/104; B25B 5/14; B25B 5/163
USPC .................. 74/571.1, 572.2, 573.1, 574.1–4; 192/30 V; 301/5.22
IPC ........................................ F16F 15/36
See application file for complete search history.

(56) References Cited

U.S. PATENT DOCUMENTS 2,398,722 A * 4/1946 Rubissow .................. 74/574.3
RE25,383 E * 5/1963 Morrill ........................ 301/5.22
(Continued)

FOREIGN PATENT DOCUMENTS

JP    2001-101779    4/2001
JP    2001-184777    7/2001
(Continued)

OTHER PUBLICATIONS

JP2009-41633A—Machine Translation.*
(Continued)

*Primary Examiner* — Vinh Luong
(74) *Attorney, Agent, or Firm* — Renner, Otto, Boisselle & Sklar, LLP

(57) ABSTRACT

[Problem to be Solved]
To provide a balancer that can correct dynamic imbalance in rotatable bodies such as machine tools. The correction for low-speed rotation is possible to the same extent as that for high-speed rotation.
[Solution to Problem]
The balancer, attachable via its attaching portion to a rotatable body, and rotatable together therewith about its rotation axis, includes: weights of same mass and shape; and a weight holder with storage chambers for housing the weights, respectively, such that the weights can oscillate in arbitrary directions. The weight is shaped similar to and smaller than the chamber. The chamber is a cylindrical space extending alongside its central axis; and has concave curved ends perpendicular to the central axis. Midpoints of the central axes of the chambers are contact points on a circumference of a circle having the rotation axis as its center and being on an arbitrary plane perpendicular to the rotation axis; and are positioned so that they create a rotational symmetry around the rotation axis.

2 Claims, 9 Drawing Sheets

(51) Int. Cl.
    *F16C 15/00*     (2006.01)
    *B24B 41/00*     (2006.01)
    *B23B 5/22*     (2006.01)
    *F16F 15/36*     (2006.01)

(56) References Cited

U.S. PATENT DOCUMENTS

| | | | | |
|---|---|---|---|---|
| 3,244,428 | A * | 4/1966 | Rohm | 279/60 |
| 3,913,980 | A * | 10/1975 | Cobb, Jr. | 301/5.22 |
| 3,953,074 | A * | 4/1976 | Cox | 301/5.22 |
| 4,721,423 | A * | 1/1988 | Kubo | 409/234 |
| 5,256,037 | A * | 10/1993 | Chatelain | 417/423.7 |
| 5,269,197 | A * | 12/1993 | Yang | 74/570.2 |
| 5,295,411 | A * | 3/1994 | Speckhart | 74/574.3 |
| 5,829,318 | A * | 11/1998 | Hannah et al. | 74/570.2 |
| 6,427,656 | B1 * | 8/2002 | Drecq et al. | 123/192.1 |
| 6,538,852 | B1 * | 3/2003 | Osawa et al. | 360/265.2 |
| 6,547,053 | B2 * | 4/2003 | Shih | 192/55.61 |
| 6,705,181 | B2 * | 3/2004 | Tabuchi et al. | 464/68.91 |
| 7,217,072 | B1 * | 5/2007 | Haimer | 409/234 |
| 7,284,460 | B2 * | 10/2007 | Yamamoto | 74/573.1 |
| 2003/0002991 | A1 * | 1/2003 | Kawata et al. | 417/222.1 |
| 2004/0003677 | A1 * | 1/2004 | Yamamoto | 74/573 F |
| 2007/0257413 | A1 * | 11/2007 | Retzbach et al. | 269/287 |
| 2008/0060472 | A1 | 3/2008 | Yamamoto | |
| 2010/0175956 | A1 * | 7/2010 | Zadoks | 188/268 |

FOREIGN PATENT DOCUMENTS

| | | |
|---|---|---|
| JP | 2001-216715 | 8/2001 |
| JP | 2006-189164 | 7/2006 |
| JP | 2009-041633 | 2/2009 |

OTHER PUBLICATIONS

Search Results for kidnay, National Library of Medicine, nih.gov, Sep. 22, 2014.*
Similar, Definition from merriam-webster.com/dictionary, Sep. 20, 2014.*
Similar dictionary definition, yourdictionary.com, Sep. 20, 2014.*
dictionary.reference.com/browse/corresponding?s=t. Apr. 17, 2015.*
merriam-webster.com/dictionary/corresponding. Apr. 17, 2015.*
EPO Machine Translation of JP 2009-041633, Masayasu, Feb. 26, 2009.*
International Search Report for corresponding International Application No. PCT/JP2010/005943 mailed Oct. 26, 2010.

* cited by examiner

BALANCER

TECHNICAL FIELD

The present invention relates to a balancer for suppressing vibration caused during rotation in various rotatable bodies such as various machine tools.

BACKGROUND ART

With respect to rotatable bodies such as various machine tools, it is necessary to correct dynamic imbalance caused by vibration, etc. at times of rotation. Until now, dynamic imbalance has been corrected by measuring and obtaining the amount and phase angle of imbalance, with use of a balance measuring device; and then shedding off or adding the amount equivalent to the amount of the imbalance. However, correction of such dynamic imbalance has been a fixed balance correction made for a certain rotation speed designated for measurement. Therefore, although balance immediately after correction would be fine, dynamic imbalance would be created again in instances where there is remarkable change in rotation speed or change in the weight of the rotatable body due to tool changing or the like, since there would also be change in the balance corrective value. That is, adaptation to changes in rotation conditions has not been possible, thus requiring balance correction every time there is change in rotation conditions.

In this regard, Patent Literature 1 basically provides, as a balancer, an automatic dynamic balancer comprising: a casing capable of being driven to rotate together with a rotatable body; storage chambers drilled inside the casing and arranged in a radial manner toward a circumference created in the rotating direction; outer weights housed in the storage chambers, respectively, with extra space serving as a buffer also provided therein; inner-weight-holding spaces drilled in the outer weights, respectively; inner weights held in the inner-weight-holding spaces, respectively, with extra space serving as a buffer also provided therein; and a cover for the casing. Also, formed on the outer weight at its surface which defines its outer outline, is a sliding surface for being biased toward the storage chamber, the formation being due to centrifugal force created by rotation of the rotatable body; and formed in the storage chamber at its surface which defines its inner outline, is a guiding plane for guiding in a sliding manner the sliding surface of the outer weight, toward the bottom of the storage chamber. Thus, in rotatable bodies such as various machine tools, even if there is change in rotation conditions such as change in rotation speed or in the amount of rotation, the change would be traced, thereby enabling automatic correction of dynamic imbalance caused by vibration, etc. during rotation.

CITATION LIST

Patent Literatures

[Patent Literature 1] Japanese Laid-Open Patent Publication No. 2009-41633

SUMMARY OF INVENTION

Technical Field

However, with respect to the balancer described in Patent Literature 1, dynamic imbalance correction is excellent when the rotatable body rotates at high speed, for example, about 50,000 rpm; but is insufficient when the rotatable body rotates at low speed, for example, about 500 rpm.

Therefore, the present invention aims to provide a balancer capable of correcting dynamic imbalance in rotatable bodies such as various machine tools, in which correction for low-speed rotation is possible to the same extent as that for high-speed rotation.

Solution to Problem

The present inventors conducted studies, believing that lack of centrifugal force created by rotation was the reason for poor performance in correcting dynamic imbalance, particularly at times of low-speed rotation. As a result, they found that only correcting dynamic imbalance in a plane (X-Z plane) perpendicular to a rotation axis (Z-axis) was not sufficient; and that correcting dynamic imbalance in the direction of the rotation axis was also necessary, in instances where centrifugal force was lacking. This finding has lead to the present invention.

That is, the present invention is directed to a balancer capable of being attached to and rotating together with a rotatable body about a rotation axis of the rotatable body, the balancer comprising:
  a plurality of weights having the same mass and shape; and
  a weight holder having a plurality of storage chambers drilled therein, the storage chambers being capable of housing the weights in a manner such that they each freely oscillate in arbitrary directions,
  wherein the storage chamber comprises a position maintaining plane and a guiding plane facing each other in parallel, and a receiving surface joining the position maintaining plane and the guiding plane,
    wherein the guiding plane is inclined away from the rotation axis of the rotatable body as if it runs alongside a side of a cone, the cone having a vertex through which the rotation axis passes and a base to which the rotation axis is perpendicular,
    compared to the guiding plane, the position maintaining plane and the receiving surface are positioned nearer to the base of the cone,
    the respective storage chambers are formed in a manner such that they create a rotational symmetry around the rotation axis, and
    a weight insertion opening of the respective storage chambers, provided at a position facing the receiving surface, is covered with a surface of a part of the weight holder serving as a cover, and
  wherein the weight comprises a leaning plane and a first pressing surface facing each other in parallel, a second pressing surface and a third pressing surface facing each other in parallel, and respectively joining the leaning plane and the first pressing surface, and two curved end surfaces respectively joining both end sides of each of the leaning plane, the first pressing surface, the second pressing surface, and the third pressing surface,
    wherein the weight is housed inside the storage chamber in a manner such that the leaning plane is capable of abutting against the position maintaining plane, the first pressing surface is capable of abutting against the guiding plane, the second pressing surface is capable of abutting against the receiving surface, and the third pressing surface is capable of abutting against the surface of a part of the weight holder serving as a cover, and
    the receiving surface of the respective storage chambers is concave curved, and the second pressing surface and the third pressing surface of the weight are convex curved.

Most important among the above, is that the receiving surface of the respective storage chambers is concaved curved, and the second and third pressing surfaces of the weight are convex curved.

Also, by making the weight cylindrical by curving the leaning plane and the first pressing surface and thus allowing the leaning plane, the second pressing surface, the first pressing surface, and the third pressing surface to communicate in succession to one another; and moreover, by changing the shape of the storage chamber to be similar to and larger than the shape of the weight, the present invention can be embodied as a balancer, wherein the weight has a shape similar to and smaller than the shape of the storage chamber, the storage chamber is a cylindrical space extending alongside a central axis of the storage chamber and has end surfaces perpendicular to the central axis, the end surfaces both being concave curved, and respective midpoints of the respective central axes of the storage chambers are contact points on a circumference of a circle having the rotation axis as its center, the circle being on an arbitrary plane perpendicular to the rotation axis; and are positioned in a manner such that they create a rotational symmetry around the rotation axis.

Advantageous Effects of Invention

According to the balancer of the present invention, by making the receiving surface of the storage chamber concave curved and the second and third pressing surfaces of the weight convex curved, or, in the alternative, by making the storage chamber and the weight entirely cylindrical, it is possible to effectively correct dynamic imbalance, not only in the direction of the X-Z plane, but also in the direction of the Z-axis (rotation axis), in instances where there is change in rotation conditions, that is, when there is change in rotation speed or in the amount of rotation of the rotatable body.

Due to the above, the balancer of the present invention enables effective correction of dynamic imbalance, not only when the rotatable body rotates at high speed, but also when it rotates at low speed. As such, it is possible to obtain a balancer adaptable to both high and low speeds of a rotatable body, that is, a balancer adaptable to any rotation speed thereof. Also, dynamic imbalance is corrected in all directions of X, Y, and Z which create a three-dimensional space. Therefore, when the balancer of the present invention is applied to a rotatable body, being, for example, a grinding/abrading machine comprising a grinding wheel, the service life of the grinding wheel is remarkably extended since the grinding wheel wears away in a uniform manner and not in a non-uniform manner. Likewise, when the balancer is applied to spindles for various machine tools, the respective wear limits of the spindles are extended. Also, the highly accurate and simple mechanical structure of the balancer makes electricity, oil, and air pressure unnecessary, and the design and production thereof which depend on the shape of the main shaft of the machines, enables the main shaft to be in any shape.

Also, when the balancer of the present invention is applied to a grinding/abrading machine comprising a grinding wheel and the machine is used to grind a target material to create recesses therein, the resultant recesses are able to have a mirror-like finish due to improvement in grinding precision, unquestionably at the recess bottom, and particularly at the recess side walls where grinding has been insufficient until now.

Also, in instances where the weight of the balancer has a single structure, when the rotatable body is with a designated resonant frequency and thus rotates at that resonant frequency, the balancer slightly deteriorates in its ability to correct dynamic imbalance. However, by configuring the weight to have a double structure comprising an outer weight and an inner weight, it is possible to remarkably reduce deterioration of the balancer in its ability to correct dynamic imbalance due to such resonant frequency.

Furthermore, with respect to the balancer of the present invention, the weight has a shape similar to and smaller than the shape of the storage chamber; the storage chamber is a cylindrical space extending alongside a central axis of the storage chamber and has end surfaces perpendicular to the central axis, the end surfaces both being concave curved; respective midpoints of the respective central axes of the storage chambers are contact points on a circumference of a circle having the rotation axis as its center, the circle being on an arbitrary plane perpendicular to the rotation axis; and the midpoints are positioned in a manner such that they create a rotational symmetry around the rotation axis. By the above, processing is made easier than in prior art. Therefore, production costs can be kept low, without there being any deterioration of the balancer in its ability to correct dynamic imbalance.

DESCRIPTION OF EMBODIMENTS

Figure 1:
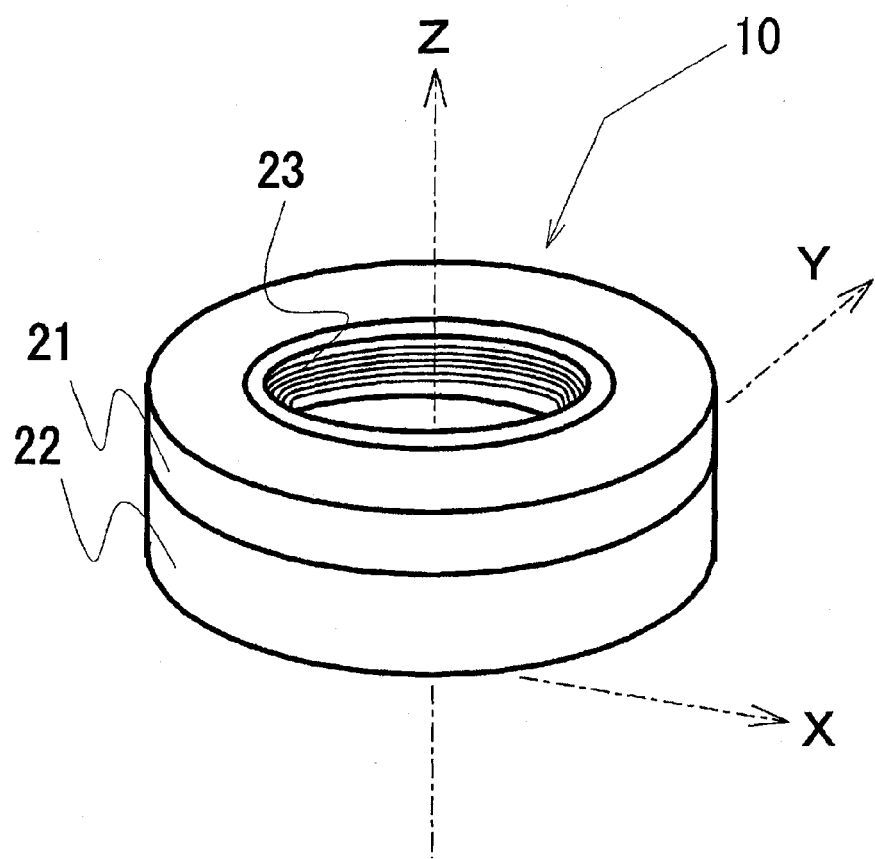
FIG. 1 is an explanatory view of the exterior and outline of a balancer of the present invention.

The present invention will be described in detail with reference to the drawings. FIG. 1 illustrates the exterior and outline of a balancer 10 of the present invention. The balancer of the present invention comprises: a plurality of weights 40 having the same mass and shape; and a weight holder having a plurality of storage chambers 30 capable of housing the weights 40 in a manner such that they each freely oscillate in arbitrary directions. The weights 40 and the storage chambers 30 for housing the weights 40 do not appear on the exterior, since they are formed inside the weight holder. In association with rotational balance, it is necessary for all of the storage chambers 30 to also have the same shape, as with the weights.

Figure 2:
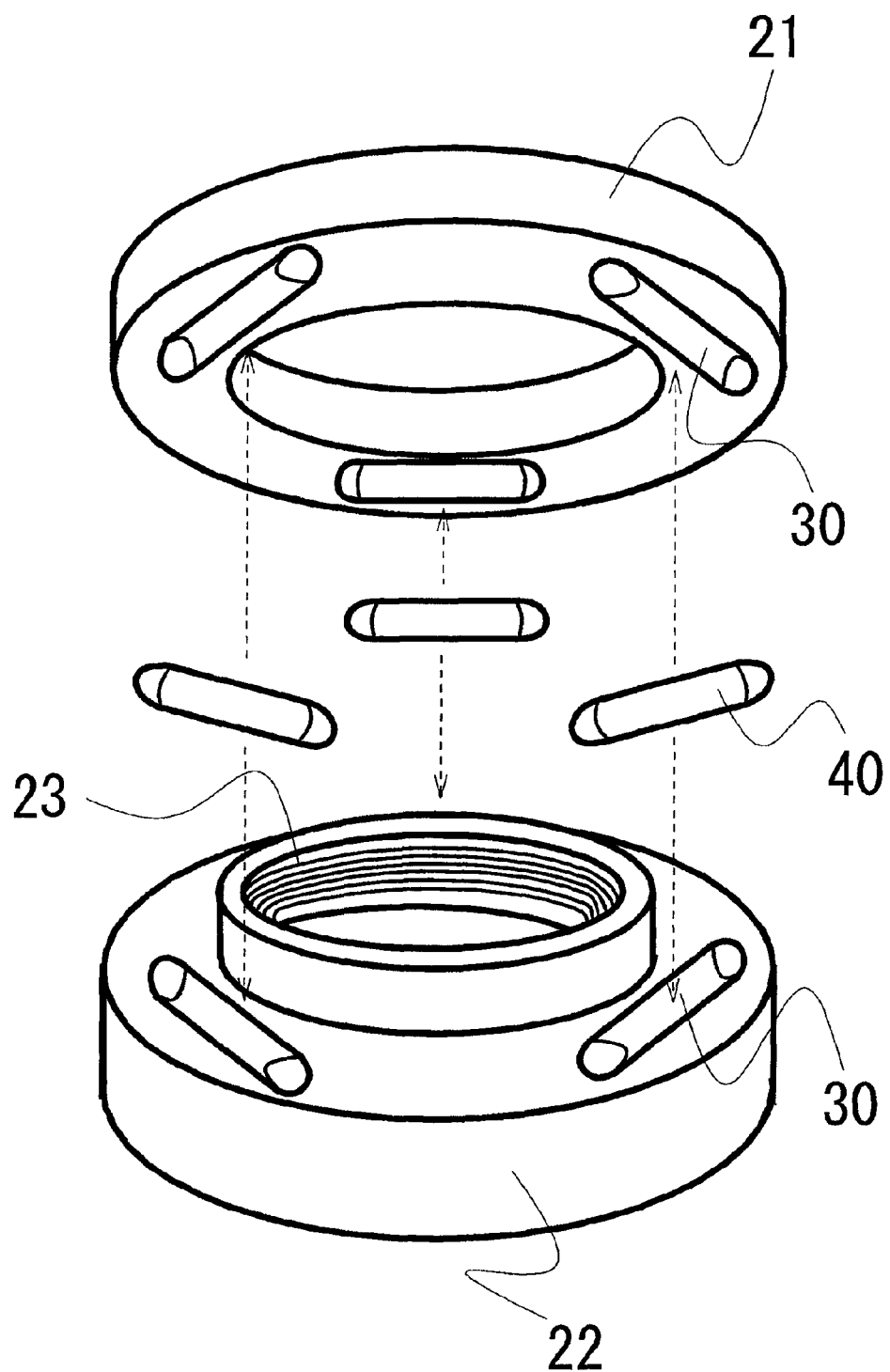
FIG. 2 is an exploded view of a first embodiment of the balancer of the present invention.
Figure 6:
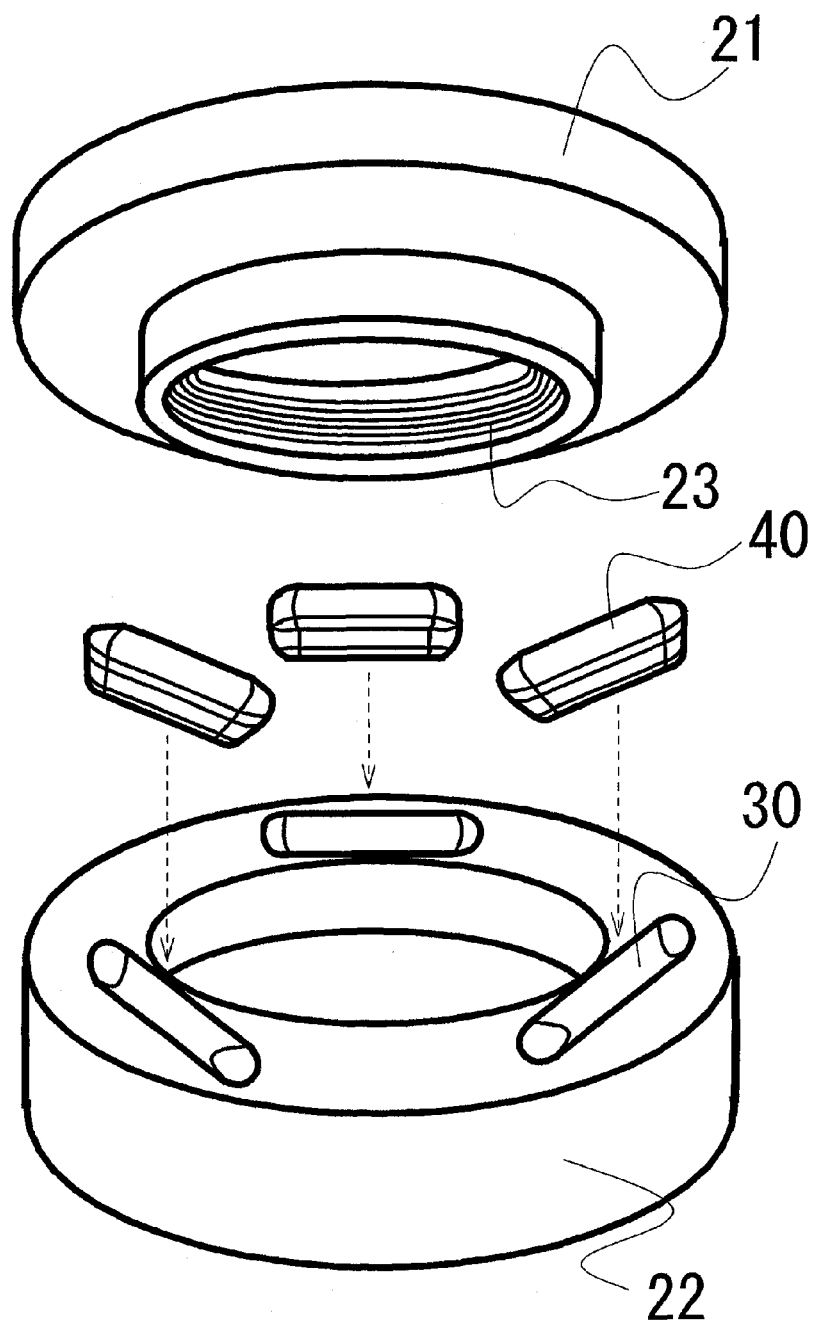
FIG. 6 is an exploded view of a second embodiment of the balancer of the present invention.

For the storage chambers 30 to be disposed inside the weight holder, and for the weights 40 to be housed in the storage chambers 30, respectively, it would be convenient if the weight holder, as illustrated in, for example, FIGS. 2 and 6, is configured such that a weight holder cover 21 and a weight holder body 22 are capable of being fit together to form a whole; and the storage chambers 30 are disposed at the portion where the weight holder cover 21 and the weight holder body 22 are joined. This would enable easy housing of the weights 40. After the weights 40 are housed in the storage chambers 30, the weight holder body 22 and the weight holder cover 21, which are results of dividing the weight holder, can be fit together to form a whole by a suitable fitting method such as thermal fitting.

The weight 40 is housed in the storage chamber 30 in a manner such that it can freely oscillate in all directions of X-, Y-, and Z-axes which create a three-dimensional space. The weight 40 is preferably capable of oscillating in the storage chamber, typically for a distance of about 0.005 to 0.01 mm in the each direction, although this depends on the extent to which imbalance in the rotatable body is corrected. When the possible oscillation distance becomes longer, the precision of dynamic imbalance correction starts to lower.

Figure 3:
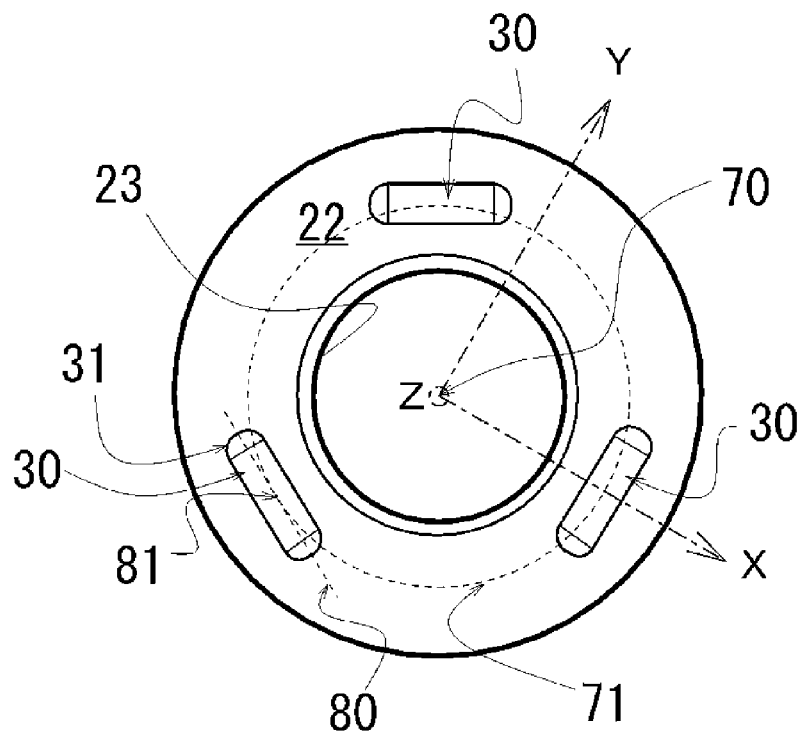
FIG. 3 is a top view of a weight holder body used in the first embodiment of the balancer of the present invention.
Figure 7:
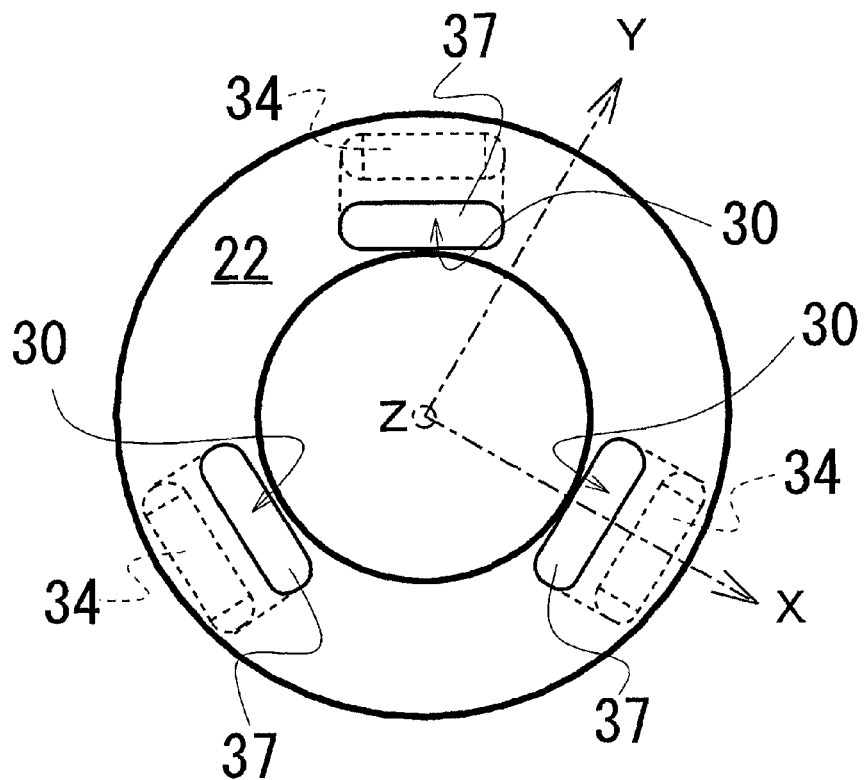
FIG. 7 is a top view of a weight holder body used in the second embodiment of the balancer of the present invention.

As in the top views of the weight holder body 22 in FIGS. 3 and 7, there is a plurality of the storage chambers 30. Therefore, the number of the weights 40 to be housed depends on the number of the storage chambers 30 available. As illustrated in FIGS. 3 and 7, the storage chambers 30 are disposed in a manner such that, when viewed from a rotation axis (Z-axis), they create a rotational symmetry about the rotation axis. The number of the storage chambers 30 is required to be plural for creating the rotational symmetry, and is preferably an odd number for rotational balance. However, even if three or more of the storage chambers 30 are disposed, the balancer would not change much in its ability to correct dynamic imbalance, despite the large amount of work required for its processing. Therefore, three is most appropriate as the number of the storage chambers 30. In the embodiments of FIGS. 3 and 7, the number of the storage chambers 30 is three and the angle of the rotational symmetry is 120°.

The balancer 10 of the present invention is attached to a rotatable body such as a machine tool and rotated together therewith, with a rotation axis of the rotatable body as the center. For uniform rotation, the balancer 10 of the present invention is preferably ring-shaped, as illustrated in FIG. 1. In the embodiment of FIG. 1, the rotatable body is integrated with the balancer 10 by being attached to a rotatable-body-attaching portion 23 disposed on the inner side of the ring-shaped balancer 10. In the embodiment of FIG. 1, ridges are provided on the rotatable-body-attaching portion 23 by tapping, and the rotatable body is thus screwed to the balancer 10. However, the rotatable body may be integrated with the balancer 10 by a method other than screwing, such as thermal fitting.

A material suited for the weight holder has a stiffness equaling that of steel, a high thermal expansion coefficient, and a small specific weight, examples thereof including aluminum alloys, stainless steel, and titanium-based materials. On the other hand, a material suited for the weight 40 has a large specific weight and high anti-corrosive properties, one example thereof being stainless steel.

First Embodiment

FIG. 2 is an exploded view of a first embodiment of the balancer of the present invention. The weight 40 used in the first embodiment has a cylindrical shape, its end portions being curved as will be described later. Therefore, in terms of processing, it is easy for the storage chambers 30 to be disposed as illustrated in FIG. 2. That is, the balancer is divided at its center into the weight holder cover 21 and the weight holder body 22, and then, the storage chambers 30 are provided therein by drilling.

The storage chamber 30 in the first embodiment of the balancer 10 is a cylindrical space, and therefore has a central axis. Respective surfaces of the ends of this cylinder, that is, end surfaces of this cylinder both perpendicular to the central axis, are curved and not flat.

Figure 4:
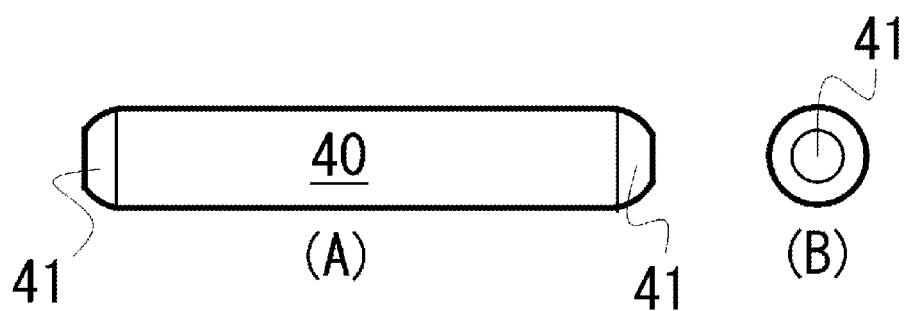
FIG. 4 consists of a front view (A) and a right side view (B) of a weight used in the first embodiment of the balancer of the present invention.

Also, the weight 40 in the first embodiment of the balancer 10 has a cylindrical shape as illustrated in FIG. 4, and both of end surfaces 41 of this cylinder are curved. That is, the weight 40 has a shape similar to and smaller than the shape of the storage chamber 30. In FIG. 4, the shape of the weight in the first embodiment of the present invention is represented by a six-view orthographic projection. The top, bottom, and rear views are omitted since they appear the same as the front view (A), and the left side view is omitted since it appears the same as the right side view (B). As above, by making the storage chamber 30 and the weight 40 both cylindrical, the curved surfaces can receive the force generated by displacements from the rotation axis (Z-axis) direction, thereby making it possible to correct dynamic imbalance in the Z-axis direction.

As long as the end surface 31 of the storage chamber 30 and the end surface 41 of the weight 40 are concave curved and convex curved, respectively, so as to match with one another, they are not limited to any particular shape. They may be hemispherical, or may be shaped as illustrated in FIG. 4, that is, shaped as if the tip of a hemisphere has been cut off. In brief, it will suffice as long as the storage chamber 30 and the weight 40 both have a curved structure capable of receiving dynamic imbalance in a plane (X-Y plane) perpendicular to the rotation axis.

Respective midpoints 81 of the respective central axes 80 of the storage chambers 30 are contact points on a circumference of a circle 71 having the rotation axis (Z-axis) 70 as its center, the circle 71 being on an arbitrary plane perpendicular to the rotation axis (Z-axis) 70; and are positioned in a manner such that they create a rotational symmetry around the rotation axis. Thus, in the first embodiment of the balancer 10, the storage chambers 30 ensure a rotational symmetry.

Figure 5:
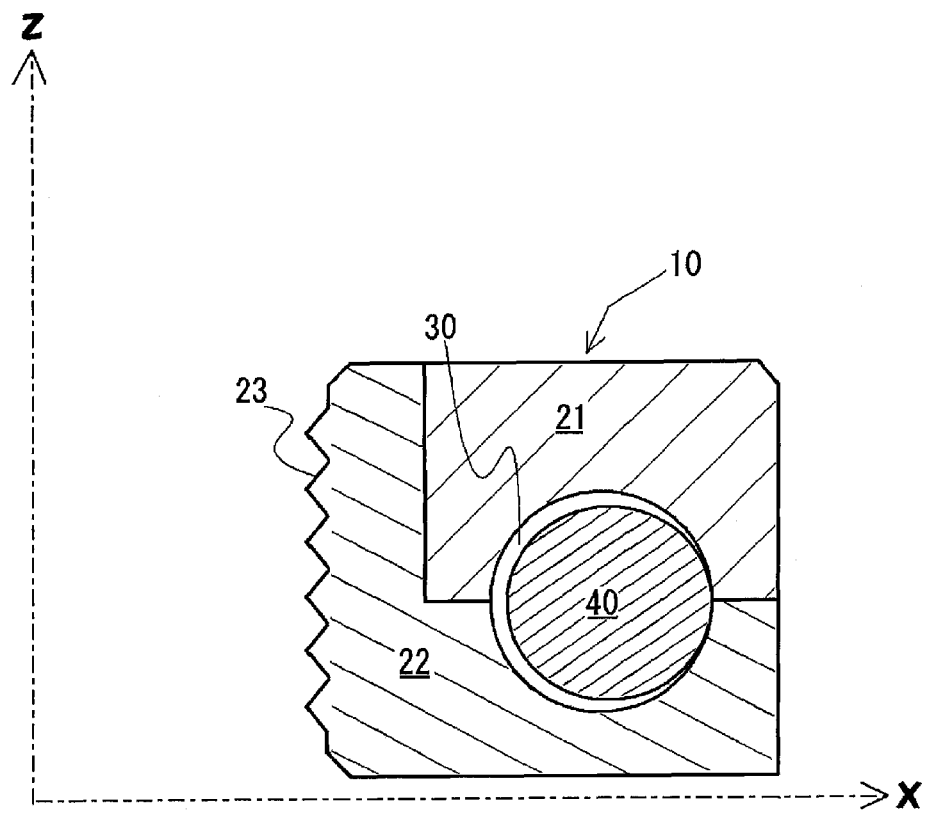
FIG. 5 is an end view of an X-Z plane (X>0, Z>0) of FIG. 1, for the first embodiment of the balancer of the present invention.

FIG. 5 is an end view of an X-Z plane of FIG. 1, the end view showing the manner in which the weight 40 is housed in the storage chamber 30, in the first embodiment of the balancer 10. Note that only the region bounded by the positive half of the X-axis and the positive half of the Z-axis, is shown. As evident from FIG. 5, the weight 40 having a shape similar to and smaller than the shape of the storage chamber 30, is housed in the storage chamber 30 in a manner such that a small amount of space (0.005 to 0.01 mm) remains.

Second Embodiment

FIG. 6 is an exploded view of a second embodiment of the balancer 10 of the present invention. The weight 40 used in the second embodiment is housed in the storage chamber 30 which is inclined away from the rotation axis (Z-axis), as will be described later. Therefore, in terms of processing, it is not easy for the storage chambers 30 to be disposed in the manner as illustrated in FIG. 2, which is by dividing the balancer at its center into the weight holder cover 21 and the weight holder body 22 and then providing the storage chambers therein by drilling. Therefore, it would be convenient if the storage chamber 30 is drilled in either one of the weight holder cover 21 and the weight holder body 22 (in the case of FIG. 6, this applies to the weight holder body), and the abutting surface of the other (in the case of FIG. 6, this applies to the weight holder cover) serves as a cover for weight insertion openings 37 of the storage chambers 30.

The storage chamber 30 in the second embodiment of the balancer 10 comprises a position maintaining plane 32, a guiding plane 33, a receiving surface 34, and the weight insertion opening 37; and is disposed in a manner such that it is inclined away from the Z-axis direction. The positional relationship among these planes and surface is as follows. The entire shape of the weight insertion opening 37 appears in FIG. 7 which is a top view of the weight holder body 22. The receiving surface 34, as indicated by dotted lines in FIG. 7, is present as a bottom surface that is further inward from the weight insertion opening 37 and faces the weight insertion opening 37. The position maintaining plane 32 and the guiding plane 33 are joined, with the receiving surface 34 interposed therebetween; and face each other in parallel. In FIG. 7, an end side of the position maintaining plane 32 appears as a straight line of the weight insertion opening 37, the straight line being the one near the rotation axis; and an end side of the guiding plane 33 appears as a straight line of the weight insertion opening 37, the straight line being the one far from the rotation axis. The weight insertion opening 37 is covered with the surface of the part of the weight holder serving as the cover (in the case of the embodiment illustrated in FIGS. 6 and 7, this applies to the surface of the weight holder cover 21 which abuts against the weight holder body 22).

Also, the central axis perpendicular to the receiving surface 34 of the storage chamber 30 is inclined away from the rotation axis of Z, at a predetermined angle θ. The inclined angle θ is preferably 45 degrees±30 degrees, that is, within the range of 15 degrees to 75 degrees, and particularly preferably about 45 degrees. Therefore, in the case of FIG. 7 being the top view of the weight holder body, the storage chambers 30, as indicated by the dotted lines in the drawing, are drilled to be provided in a radial manner and in an outward direction from the weight insertion openings 37 disposed near the rotation axis.

To express the above inclined state by referring to the planes and surface of the storage chamber 30, the guiding plane 33 is inclined away from the rotation axis of the rotatable body as if it runs alongside a side of a (virtual) cone, the cone having a vertex through which the rotation axis passes and a base to which the rotation axis is perpendicular. Also, it can be said that the position maintaining plane 32 and the receiving surface 34 are positioned nearer to the base of the cone, compared to the guiding plane 33.

Figure 8:
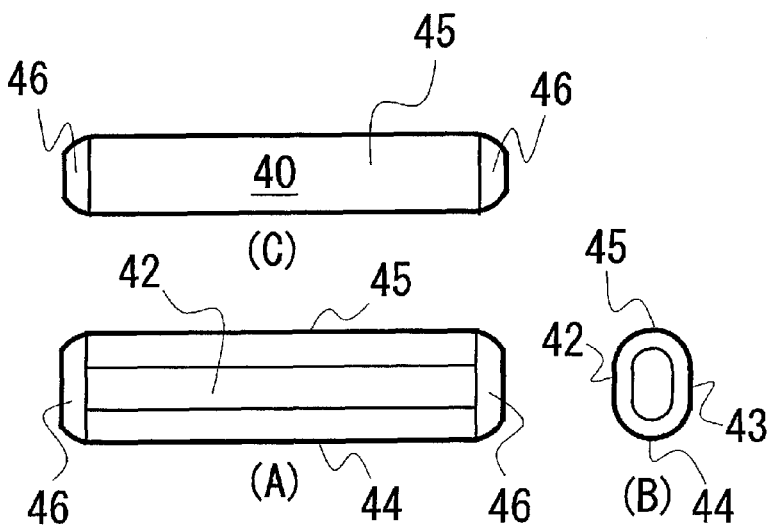
FIG. 8 consists of a front view (A), a right side view (B), and a top view (C) of a weight used in the second embodiment of the balancer of the present invention.

Also, the weight 40 in the second embodiment of the balancer 10 has a shape as that illustrated in FIG. 8. In FIG. 8, the shape of the weight in the second embodiment of the balancer 10 is represented by a six-view orthographic projection. The rear view, the left side view, and the bottom view appear the same as the front view (A), the right side view (B), and the top view (C), respectively, and are thus omitted. That is, the weight 40 in the second embodiment of the balancer 10 is shaped by a leaning plane 42 and a first pressing surface 43 facing each other in parallel; a second pressing surface 44 and a third pressing surface 45 facing each other in parallel, and respectively joining the leaning plane 42 and the first pressing surface 43; and two curved end surfaces 46 respectively joining both end sides of each of the leaning plane 42, the first pressing surface 43, the second pressing surface 44, and the third pressing surface 45.

Figure 9:
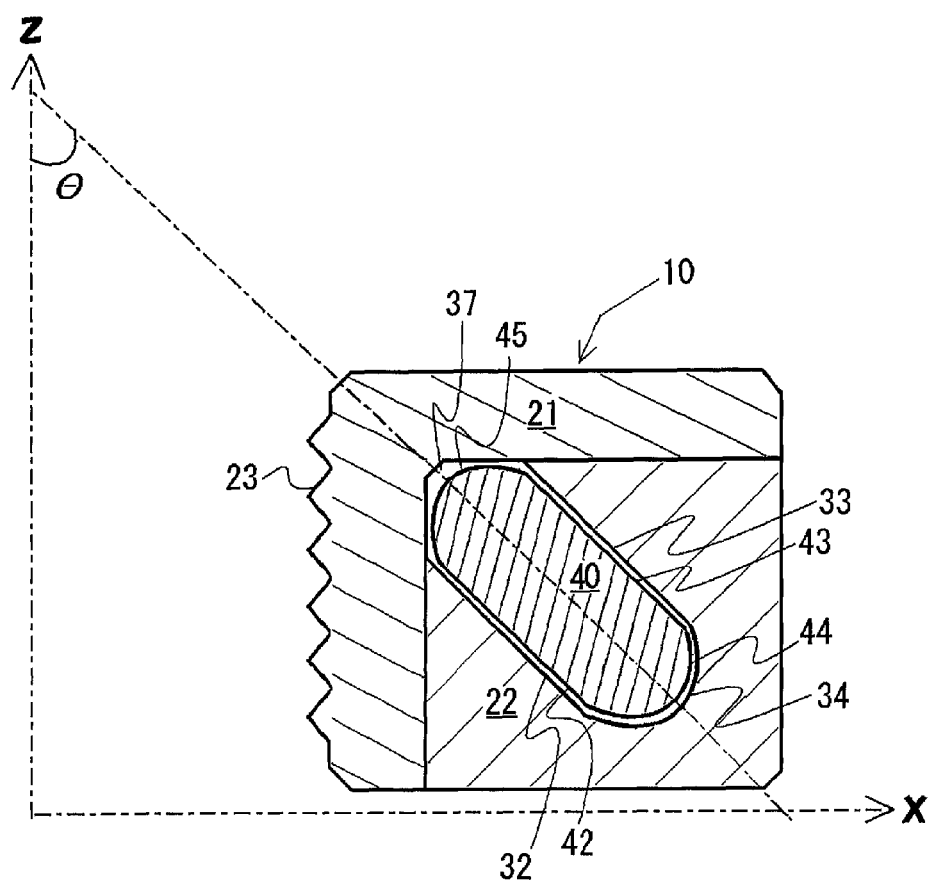
FIG. 9 is an end view of an X-Z plane (X>0, Z>0) of FIG. 1, for the second embodiment of the balancer of the present invention.

FIG. 9 is an end view of an X-Z plane of FIG. 1, the end view showing the manner in which the weight 40 is housed in the storage chamber 30, in the second embodiment of the balancer 10. Note that only the region bounded by the positive half of the X-axis and the positive half of the Z-axis, is shown. As evident from FIG. 9, the weight 40 is housed in the storage chamber 30 in accordance with the following positional relationship. That is, the leaning plane 42 abuts against the position maintaining plane 32; the first pressing surface 43 abuts against the guiding plane 33; the second pressing surface 44 abuts against the receiving surface 34; and the third pressing surface 45 abuts against the part of the weight holder serving as the cover. As evident from FIG. 9 and as in the first embodiment, the weight 40 is housed in the storage chamber 30 in a manner such that a small amount of space (0.005 to 0.01 mm) remains. That is, here, the term "abut" is not used to mean that the respective plane/surfaces of the weight 40 and the respective planes/surface of the corresponding storage chamber 30 are in a state where they all abut against one another at the same time; but is used to simply indicate a positional relationship possible of the respective plane/surfaces of the weight 40 and the respective planes/surface of the storage chamber 30 abutting against one another in a corresponding manner, during rotation of the balancer 10.

Here, in the second embodiment of the balancer 10, the receiving surface 34 of the storage chamber 30 is concave curved, and the second pressing surface 44 and the third pressing surface 45 of the weight 40 are convex curved. By shaping them as such, the curved surfaces can receive the force generated by displacements from the rotation axis (Z-axis) direction, thereby making it possible to correct dynamic imbalance in the Z-axis direction.

As long as the curved end surface 46 and the surface of the storage chamber 30 against which the curved end surface 46 is abutted, are concave curved and convex curved, respectively, so as to match with one another, they are not limited to any particular shape. They may be hemispherical, or may be shaped as illustrated in FIG. 8, that is, shaped as if the tip of a hemisphere has been cut off. In brief, it will suffice as long as the storage chamber 30 and the weight 40 both have a curved structure capable of receiving dynamic imbalance caused in a plane perpendicular to the rotation axis.

Third Embodiment

Figure 10:
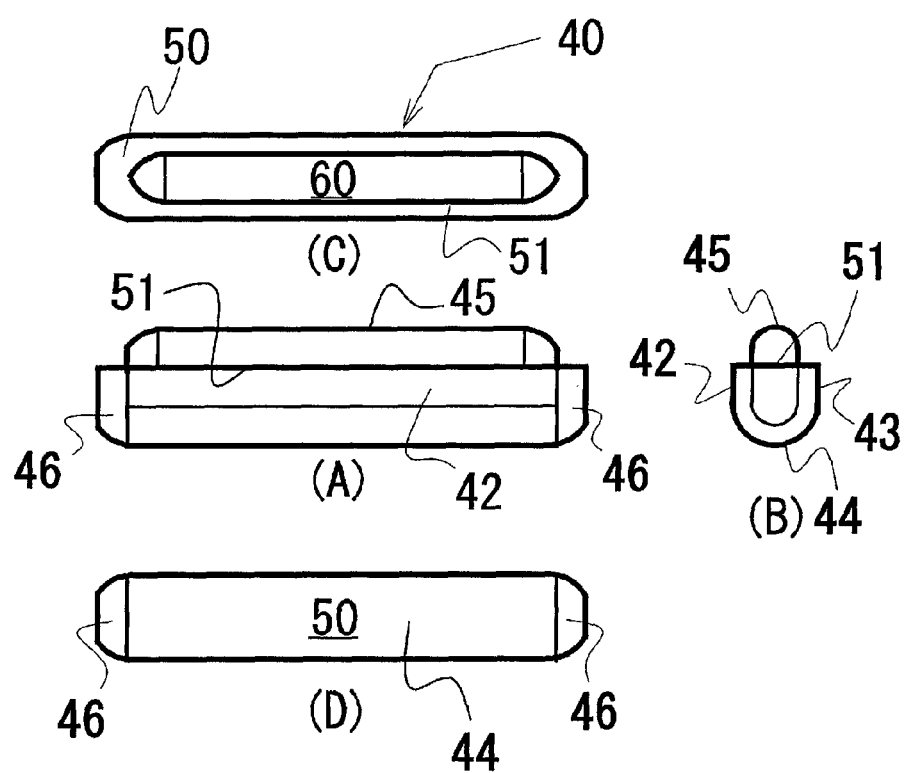
FIG. 10 consists of a front view (A), a right side view (B), a top view (C), and a bottom view (D) of a weight used in a third embodiment of the balancer of the present invention.

The third embodiment of the balancer 10 of the present invention is the same as the second embodiment, with the exception that the weight 40 comprises: an inner weight 60; and an outer weight 50 having a pocket drilled therein, the pocket capable of having the inner weight 60 inserted therein. Specifically, the third embodiment is as illustrated in FIG. 10. In FIG. 10, the shape of the weight in the third embodiment of the balancer 10 is represented by a six-view orthographic projection. The rear view and the left side view appear the same as the front view (A) and the right side view (B), respectively, and are thus omitted. Note that (C) is the top view, and (D) is the bottom view.

With respect to the weight 40 in the third embodiment, the outer weight 50 results from drilling an inner-weight-insertion opening at a position corresponding to that of the third pressing surface 45 of the weight 40 in the second embodiment; and allowing the opening to extend toward the second pressing surface 44 of the weight 40, thereby forming a pocket 51. The inner weight 60 is shaped in a manner such that it does not fit completely in the pocket 51, and partially protrudes from the inner-weight-insertion opening.

Figure 11:
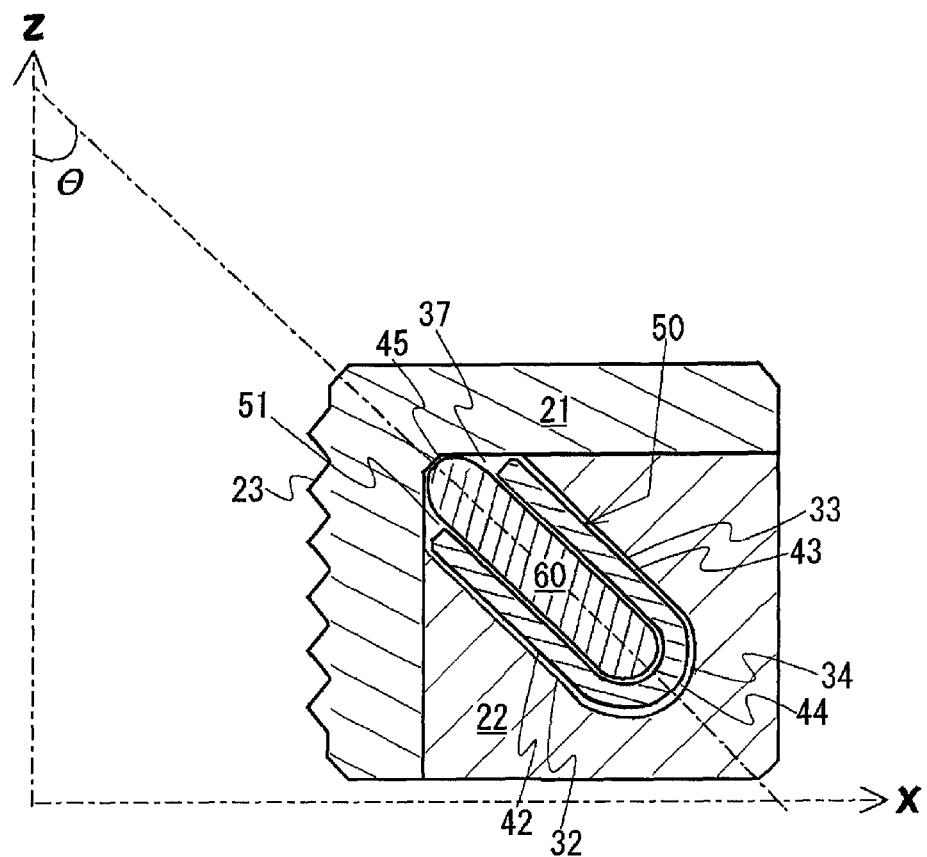
FIG. 11 is an end view of an X-Z plane (X>0, Z>0) of FIG. 1, for the third embodiment of the balancer of the present invention.

FIG. 11 is an end view of an X-Z plane of FIG. 1, the end view showing the manner in which the weight (the outer weight 50+the inner weight 60) is housed in the storage chamber 30, in the third embodiment of the balancer 10. Note that only the region bounded by the positive half of the X-axis and the positive half of the Z-axis, is shown. As evident from FIG. 11, the protruding portion of the inner weight 60 corresponds to the third pressing surface 45 in the second embodiment, and serves in a likewise manner. That is, the protruding portion of the inner weight 60 is convex curved.

Note that even the weight 40 in the first embodiment can have a double structure as above, which comprises an inner weight and an outer weight. However, considering that the weight in the first embodiment is cylindrical and has end surfaces that are both curved, its necessity of having a double structure is believed to be lower compared to the second embodiment. Furthermore, the weight 40 can have a structure that is triple or more, in which a pocket is further provided in the inner weight 60 and so forth. Such a structure is also believed to produce an effect to a more increased extent, for rotations at resonant frequencies. However, there would be a problem in terms of cost performance, considering the large amount of work required for processing.

INDUSTRIAL APPLICABILITY

The balancer of the present invention may possibly be used for various rotatable bodies in need of uniform rotation. It may possibly be applied, specifically, to items such as: tool holders, spindles, motors, screws, turbines, etc. in various machine tools such as a machining center, etc.; axles for vehicles such as automobiles and shinkansen high-speed bullet trains; turbine shafts in airplanes; turbine shafts in power generators; and the like.

EXPLANATION OF REFERENCE NUMERALS 10 balancer
21 weight holder cover
22 weight holder body
23 rotatable-body-attaching portion
30 storage chamber
32 position maintaining plane
33 guiding plane
34 receiving surface
37 weight insertion opening
40 weight
41 end surface of cylindrical weight (curved end surface)
42 leaning plane
43 first pressing surface
44 second pressing surface
45 third pressing surface
46 curved end surface
50 outer weight
51 pocket
60 inner weight
Z rotation axis

The invention claimed is:

1. A balancer capable of being attached to and rotating together with a rotatable body about a rotation axis of the rotatable body, the balancer comprising:
a plurality of weights having the same mass and shape; and
a weight holder having a plurality of storage chambers drilled therein, the storage chambers being capable of housing the weights, respectively, in a manner such that the weights each freely oscillate in arbitrary directions,
wherein each of the storage chambers comprises a position maintaining plane and a guiding plane facing each other in parallel, and a receiving surface joining the position maintaining plane and the guiding plane,
wherein the guiding plane is inclined away from the rotation axis of the rotatable body as if the guiding plane runs along a side of a cone, the cone having a vertex through which the rotation axis passes and a base to which the rotation axis is perpendicular,
compared to the guiding plane, the position maintaining plane and the receiving surface are positioned nearer to the base of the cone,
the storage chambers are formed in a manner such that the storage chambers in total create a rotational symmetry around the rotation axis, and
a weight insertion opening of each of the storage chambers, provided at a position facing the receiving surface, is covered with a surface of a part of the weight holder serving as a cover, and
wherein each of the weights comprises a leaning plane and a first pressing surface facing each other in parallel,
a second pressing surface and a third pressing surface facing each other in parallel, and each joining the leaning plane and the first pressing surface, and
two curved end surfaces each joining both end sides of each of the leaning plane, the first pressing surface, the second pressing surface, and the third pressing surface,
wherein each of the weights is housed inside each of the storage chambers in a manner such that the leaning plane is capable of abutting against the position maintaining plane, the first pressing surface is capable of abutting against the guiding plane, the second pressing surface is capable of abutting against the receiving surface, and the third pressing surface is capable of abutting against the surface of a part of the weight holder serving as the cover, and
the receiving surface of each of the respective storage chambers is concave curved, and the second pressing surface and the third pressing surface of the weights is convex curved.

2. The balancer in accordance with claim 1,
wherein each of the weights comprises an inner weight; and an outer weight having a pocket drilled therein, the pocket being capable of having the inner weight inserted therein,
the outer weight comprises the leaning plane, the first pressing surface, the second pressing surface, the two curved end surfaces, and an inner-weight-insertion opening facing the second pressing surface,
the inner-weight-insertion opening extends toward the second pressing surface, thereby forming the pocket, and
the inner weight comprises the third pressing surface, and is inserted in the pocket in a manner such that the third pressing surface protrudes from the pocket.

* * * * *